United States Patent
Sasabayashi et al.

(10) Patent No.: US 11,398,349 B2
(45) Date of Patent: Jul. 26, 2022

(54) MULTILAYER CERAMIC CAPACITOR

(71) Applicant: Murata Manufacturing Co., Ltd., Nagaokakyo (JP)

(72) Inventors: Takehisa Sasabayashi, Nagaokakyo (JP); Yasuyuki Shimada, Nagaokakyo (JP); Naoto Muranishi, Nagaokakyo (JP); Shinichi Kokawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/188,145

(22) Filed: Mar. 1, 2021

(65) Prior Publication Data
US 2021/0287854 A1    Sep. 16, 2021

(30) Foreign Application Priority Data
Mar. 16, 2020    (JP) .............................. JP2020-045017

(51) Int. Cl.
| | | |
|---|---|---|
| *H01G 4/12* | (2006.01) | |
| *H01G 4/008* | (2006.01) | |
| *H01G 4/30* | (2006.01) | |
| *H01G 4/012* | (2006.01) | |

(52) U.S. Cl.
CPC ........... *H01G 4/1227* (2013.01); *H01G 4/008* (2013.01); *H01G 4/012* (2013.01); *H01G 4/30* (2013.01)

(58) Field of Classification Search
CPC ...... H01G 4/008; H01G 4/0085; H01G 4/012; H01G 4/12; H01G 4/1209; H01G 4/1227; H01G 4/30
See application file for complete search history.

(56) References Cited

U.S. PATENT DOCUMENTS

| | | | |
|---|---|---|---|
| 7,295,422 B2 | 11/2007 | Ito et al. | |
| 8,087,136 B2 | 1/2012 | Ito et al. | |
| 9,064,636 B1 | 6/2015 | Sugita et al. | |
| 2006/0043523 A1 | 3/2006 | Ito et al. | |
| 2008/0110006 A1 | 5/2008 | Ito | |
| 2009/0219666 A1 | 9/2009 | Fukuda | |
| 2013/0286541 A1* | 10/2013 | Kawamoto | H01C 7/10 156/89.12 |
| 2017/0018363 A1 | 1/2017 | Tanaka et al. | |
| 2020/0066446 A1 | 2/2020 | Fukunaga et al. | |
| 2020/0105468 A1 | 4/2020 | Hashimoto et al. | |
| 2020/0111613 A1 | 4/2020 | Teraoka et al. | |
| 2021/0210285 A1* | 7/2021 | Sasabayashi | H01G 4/1227 |
| 2021/0287853 A1* | 9/2021 | Sasabayashi | H01G 4/0085 |

FOREIGN PATENT DOCUMENTS

JP    2006073623 A    3/2006

* cited by examiner

*Primary Examiner* — Nathan Milakovich
(74) *Attorney, Agent, or Firm* — ArentFox Schiff LLP

(57) ABSTRACT

An end surface outer layer Mn/Ti peak intensity ratio, which is a ratio of a peak intensity of Mn found by laser ICP to a peak intensity of Ti found by laser ICP in a dielectric ceramic layer in an end surface outer layer portion, is higher than a central portion Mn/Ti peak intensity ratio, which is a ratio of a peak intensity of Mn found by laser ICP to a peak intensity of Ti found by laser ICP in the dielectric ceramic layer in a central portion in a width direction, a length direction, and a layering direction in an effective portion, and a peak intensity of Ni found by TEM-EDX is in a portion of the dielectric ceramic layers in the end surface outer layer portion.

18 Claims, 11 Drawing Sheets

MULTILAYER CERAMIC CAPACITOR

CROSS REFERENCE TO RELATED APPLICATIONS

The present application claims priority to Japanese Patent Application No. 2020-045017, filed Mar. 16, 2020, the entire contents of which are incorporated herein by reference.

BACKGROUND OF THE INVENTION

Field of the Invention

The present invention relates to a ceramic capacitor and specifically to a multilayer ceramic capacitor structured such that a plurality of dielectric ceramic layers and a plurality of internal electrode layers are layered.

Description of the Background Art

A multilayer ceramic capacitor structured such that an external electrode is disposed on opposing end surfaces of a multilayer body including layered dielectric ceramic layers and internal electrode layers to conduct to the internal electrode layers has conventionally widely been used.

Japanese Patent Laid-Open No. 2006-73623 describes a multilayer ceramic capacitor structured as such, the multilayer ceramic capacitor including an element main body in which dielectric ceramic layers and internal electrode layers are alternately layered, at least one of the dielectric ceramic layer and the internal electrode layer having a different phase formed therein, the different phase containing an Mg element and an Mn element.

According to Japanese Patent Laid-Open No. 2006-73623, with the construction described above, a multilayer ceramic capacitor low in IR temperature dependency and excellent in average lifetime characteristics can be realized.

In the structure of the multilayer ceramic capacitor described in Japanese Patent Laid-Open No. 2006-73623, however, the internal electrode layer is smaller in two-dimensional area than the dielectric ceramic layer, and there is a height difference between a peripheral portion of the internal electrode layer and the dielectric ceramic layer except for a portion where the internal electrode layer is drawn to an end surface of the element main body. Under the influence of the height difference, the internal electrode layer tends to be bent, which leads to tendency of short-circuiting between the internal electrode layers or lowering in high-temperature load reliability.

In particular, as the dielectric ceramic layer is smaller in thickness and as the number of layered internal electrode layers and dielectric ceramic layers is larger, short-circuiting between internal electrode layers is more likely and reliability tends to lower.

Then, a ceramic green sheet with no height difference between a region where an internal electrode pattern to be an internal electrode layer after firing is formed and a region where no internal electrode pattern is formed (which is also referred to as a "zero-height-difference sheet" below) is layered to manufacture a multilayer ceramic capacitor.

For example, a method of forming a multilayer body has been known, in which a ceramic green sheet with no height difference between a region where an internal electrode pattern to be an internal electrode layer after firing is formed and a region where no internal electrode pattern is formed is formed by applying a conductive paste to a prescribed region on a ceramic green sheet to form the internal electrode pattern to be the internal electrode layer and thereafter applying a ceramic paste to the region where no internal electrode paste is formed to form a ceramic layer for eliminating the height difference, and such ceramic green sheets are layered.

In this case again, however, under the influence of a small gap between the internal electrode pattern and the ceramic green sheet for eliminating the height difference, a bent portion is formed in the internal electrode layer in the fired multilayer body, which may lead to occurrence of fracture or chipping of the multilayer body or lowering in high-temperature load reliability.

Therefore, under the circumstances, measures for suppressing and preventing occurrence of defects as described above are desirably taken for the multilayer ceramic capacitor.

SUMMARY OF THE INVENTION

A primary object of the present invention is to provide a multilayer ceramic capacitor that solves the problem above, the multilayer ceramic capacitor being less likely to suffer from fracture or chipping and high in high-temperature load reliability.

In order to solve the problem, a multilayer ceramic capacitor according to the present invention includes:

a multilayer body including a plurality of dielectric ceramic layers and a plurality of internal electrode layers that are alternately layered, the plurality of dielectric ceramic layers containing at least Ba, Ti, and Mn, the multilayer body defining: a first main surface and a second main surface opposed to each other in a direction of layering of the plurality of dielectric ceramic layers and the plurality of internal electrode layers, a first side surface and a second side surface opposed to each other in a width direction, the width direction being a direction orthogonal to both of the direction of layering and a direction of drawing of the plurality of internal electrode layers to a surface of the multilayer body, and a first end surface and a second end surface opposed to each other in a length direction, the length direction being a direction orthogonal to both of the direction of layering and the width direction, a first external electrode on the first end surface and electrically connected to a first set of internal electrode layers of the plurality of internal electrode layers; and a second external electrode on the second end surface and electrically connected to a second set of internal electrode layers of the plurality of internal electrode layers, wherein the plurality of internal electrode layer and the first and second external electrodes containing at least Ni, a region where the internal electrode layers are layered on one another when viewed in the direction of layering is defined as an effective portion, regions between which the effective portion lies in the direction of layering each are a main surface outer layer portion, regions between which the effective portion lies in the width direction each are a side surface outer layer portion, regions between which the effective portion lies in the length direction each are an end surface outer layer portion, an end surface outer layer Mn/Ti peak intensity ratio, which is a ratio of a peak intensity of Mn found by laser ICP to a peak intensity of Ti found by laser ICP in the dielectric ceramic layer in the end surface outer layer portion, is not lower than two times and not higher than fifteen times as high as a central portion Mn/Ti peak intensity ratio, which is a ratio of a peak intensity of Mn found by laser ICP to a peak intensity of Ti found by laser ICP in the dielectric ceramic layer in a central portion in the width direction, the length direction, and the direction of layering in the effective portion, and an end surface outer layer Ni/Ti peak intensity ratio, which is a ratio of a peak intensity of Ni found by TEM-EDX to a peak intensity of Ti found by TEM-EDX in the dielectric ceramic layer in the end surface outer layer portion, is within a range not lower than one time and not higher than six times as high as a central portion Ni/Ti peak intensity ratio, which is a ratio of a peak intensity of Ni found by TEM-EDX to a peak intensity of Ti found by TEM-EDX in the dielectric ceramic layer in the central portion in the effective portion.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

An embodiment of the present invention is shown below and features of the present invention will specifically be described.

Figure 1:
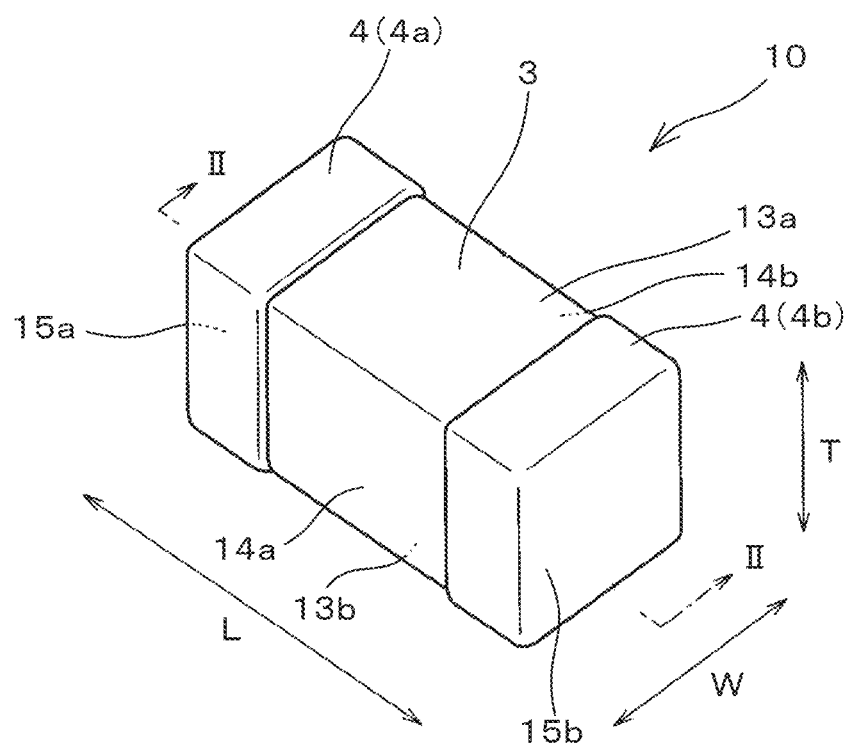
FIG. 1 is a perspective view of a multilayer ceramic capacitor according to one embodiment of the present invention.
Figure 2:
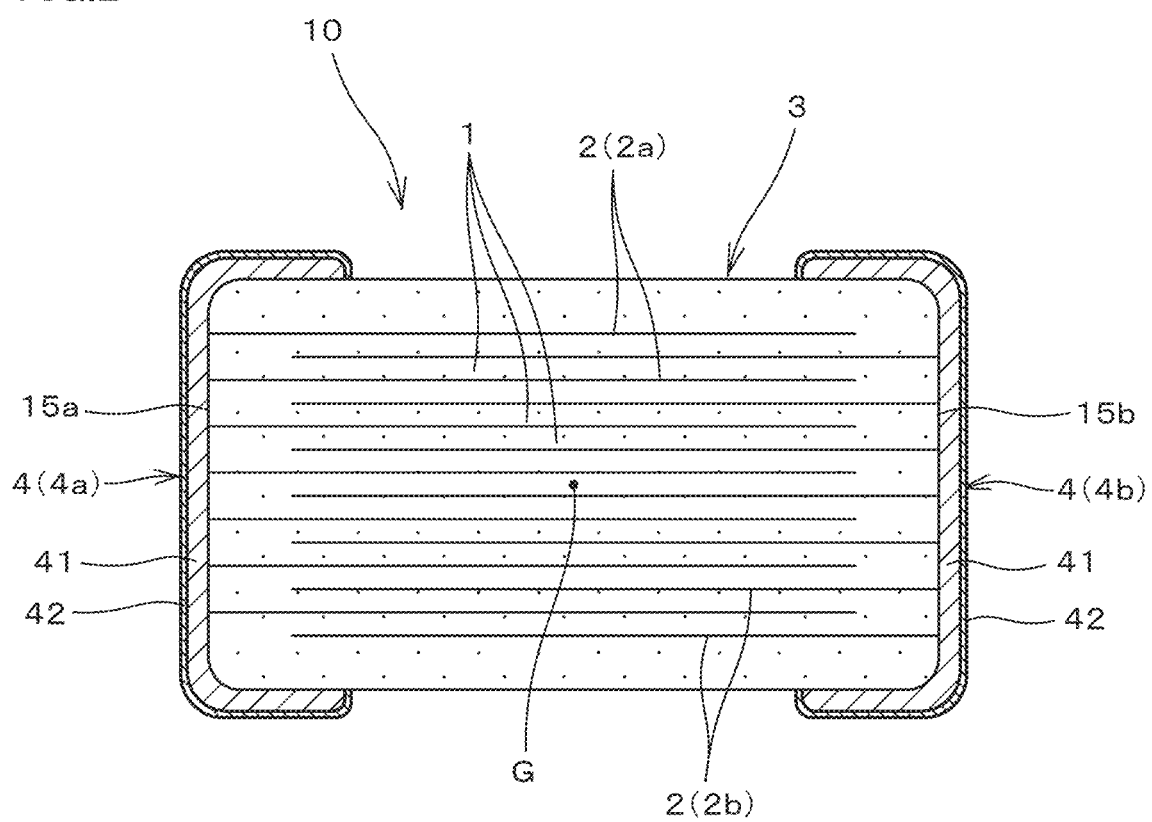
FIG. 2 is a cross-sectional view along the line II-II of the multilayer ceramic capacitor shown in FIG. 1.

FIGS. 1 and 2 are a perspective view and a front cross-sectional view of a multilayer ceramic capacitor according to one embodiment of the present invention, respectively.

As shown in FIGS. 1 and 2, a multilayer ceramic capacitor 10 is generally in a shape of a parallelepiped and includes a multilayer body 3 including a plurality of dielectric ceramic layers 1 and a plurality of internal electrode layers 2 (2a and 2b) that are layered and an external electrode 4 (4a and 4b) disposed to conduct to internal electrode layers 2 at a prescribed position of multilayer body 3.

Multilayer body 3 includes a first main surface 13a and a second main surface 13b opposed to each other in a direction of layering T of dielectric ceramic layers 1 and internal electrode layers 2, a first side surface 14a and a second side surface 14b opposed to each other in a width direction W which is a direction orthogonal to both of layering direction T and a direction of drawing of internal electrode layers 2 to a surface of multilayer body 3, that is, a length direction L below, and a first end surface 15a and a second end surface 15b opposed to each other in length direction L which is a direction orthogonal to both of layering direction T and width direction W.

Internal electrode layer 2 described above includes a first internal electrode layer 2a drawn to first end surface 15a of multilayer body 3 and a second internal electrode layer 2b drawn to second end surface 15b of multilayer body 3.

First external electrode 4a of external electrode 4 is disposed on first end surface 15a to conduct to first internal electrode layers 2a drawn to first end surface 15a and second external electrode 4b is disposed on second end surface 15b to conduct to second internal electrode layers 2b drawn to second end surface 15b.

Specifically, first external electrode 4a is formed on the entire first end surface 15a of multilayer body 3 and formed to extend from first end surface 15a to first main surface 13a, second main surface 13b, first side surface 14a, and second side surface 14b.

Second external electrode 4b is formed on the entire second end surface 15b of multilayer body 3 and formed to extend from second end surface 15b to first main surface 13a, second main surface 13b, first side surface 14a, and second side surface 14b.

Multilayer ceramic capacitor 10 according to the present embodiment has dimensions as below:

a dimension in length direction L of approximately 0.35 mm;

a dimension in width direction W of approximately 0.28 mm;

a dimension in layering direction T of approximately 0.28 mm;

a thickness of the dielectric ceramic layer of approximately 0.5 μm; and a thickness of the internal electrode layer of approximately 0.3 μm.

Multilayer ceramic capacitor 10 according to the present embodiment is manufactured through a step of layering a plurality of ceramic green sheets, each of the ceramic green sheets having an internal electrode pattern to be internal electrode layer 2 after firing disposed thereon.

Figure 6A:
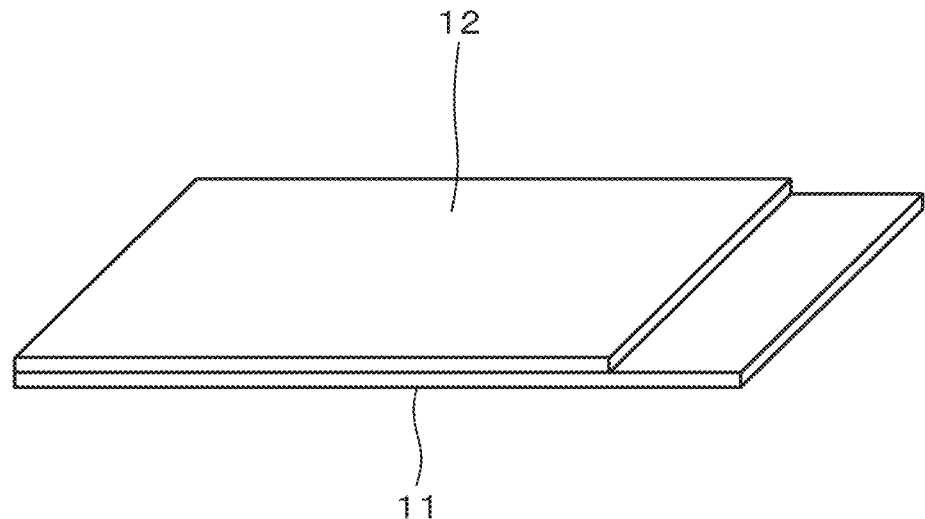
FIG. 6A is a diagram of a state before formation of a ceramic paste layer in a method of making a zero-height-difference sheet used for manufacturing a multilayer ceramic capacitor according to one embodiment of the present invention.
Figure 6B:
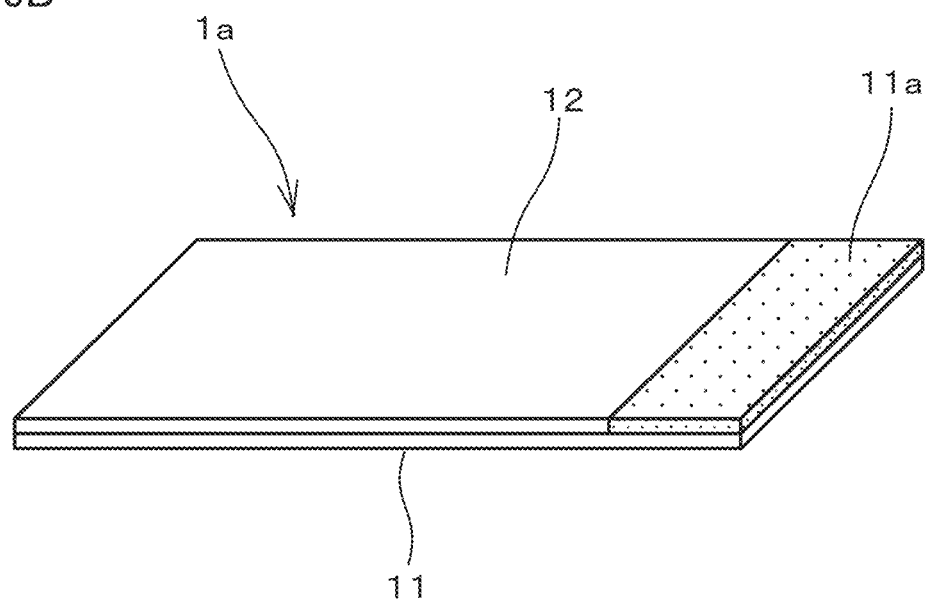
FIG. 6B is a diagram of a state after formation of the ceramic paste layer in the method of making a zero-height-difference sheet used for manufacturing a multilayer ceramic capacitor according to one embodiment of the present invention.

A ceramic green sheet (zero-height-difference sheet) 1a without a height difference between a region where an internal electrode pattern 12 to be internal electrode layer 2 after firing is formed and a region where no internal electrode pattern 12 is formed on a ceramic green sheet 11 is employed as the ceramic green sheet having the internal electrode pattern disposed thereon (see FIG. 6B).

Specifically, in the present embodiment, as shown in FIG. 6A, internal electrode pattern 12 is formed by applying a conductive paste for the internal electrode layer onto ceramic green sheet 11. Thereafter, as shown in FIG. 6B, a ceramic paste layer 11a is formed in a region where no internal electrode pattern 12 is formed. Ceramic green sheet, that is, zero-height-difference sheet, 1a with no height difference between the region where internal electrode pattern 12 is formed and the region where no internal electrode pattern 12 is formed is thus made.

Figure 7:
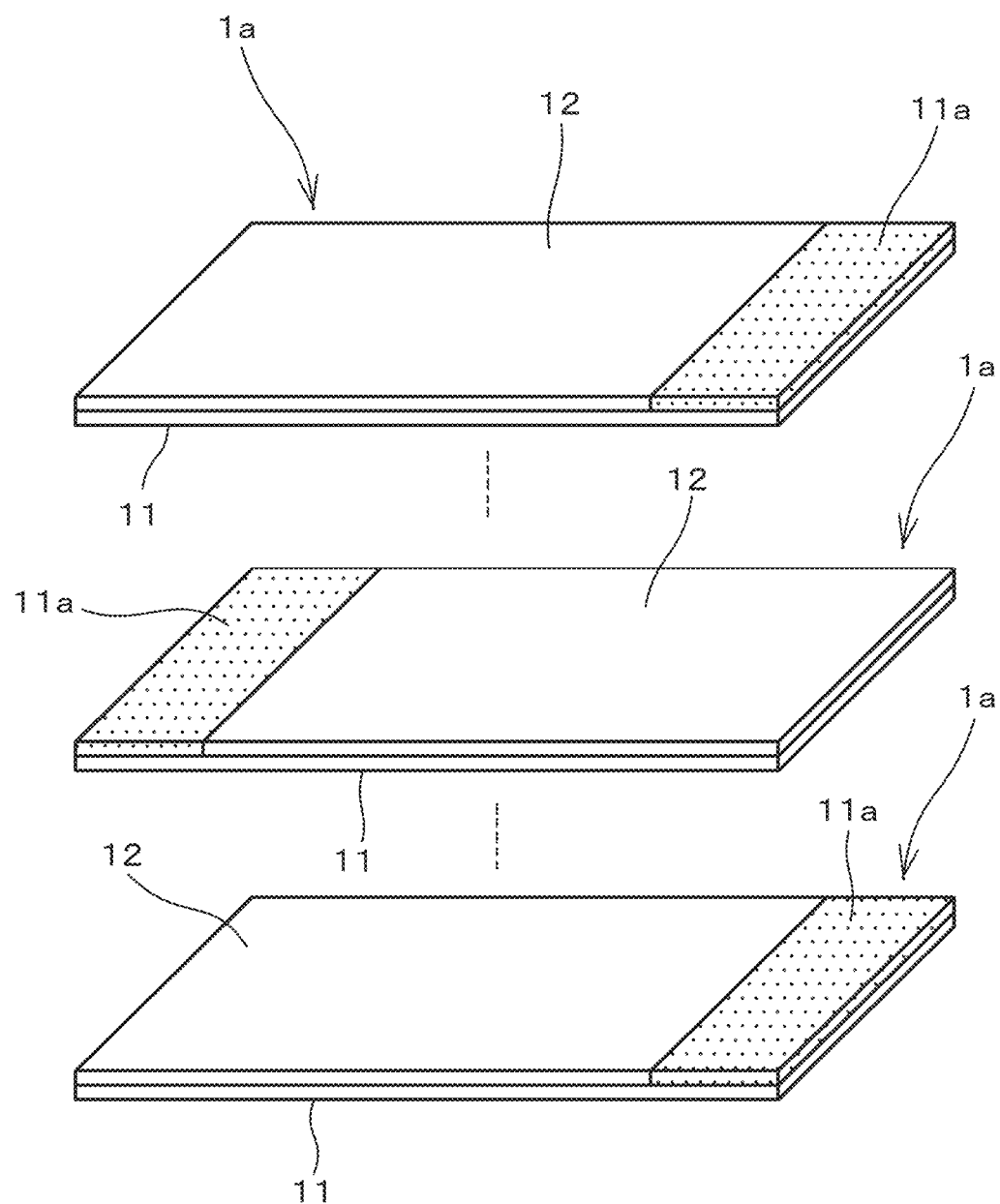
FIG. 7 is a diagram showing one step in a method of manufacturing a multilayer ceramic capacitor according to one embodiment of the present invention.

Then, as shown in FIG. 7, a prescribed number of zero-height-difference sheets 1a are layered in such a manner that internal electrode patterns 12 to be the internal electrode layers after firing are alternately drawn to opposite sides.

Figure 8:
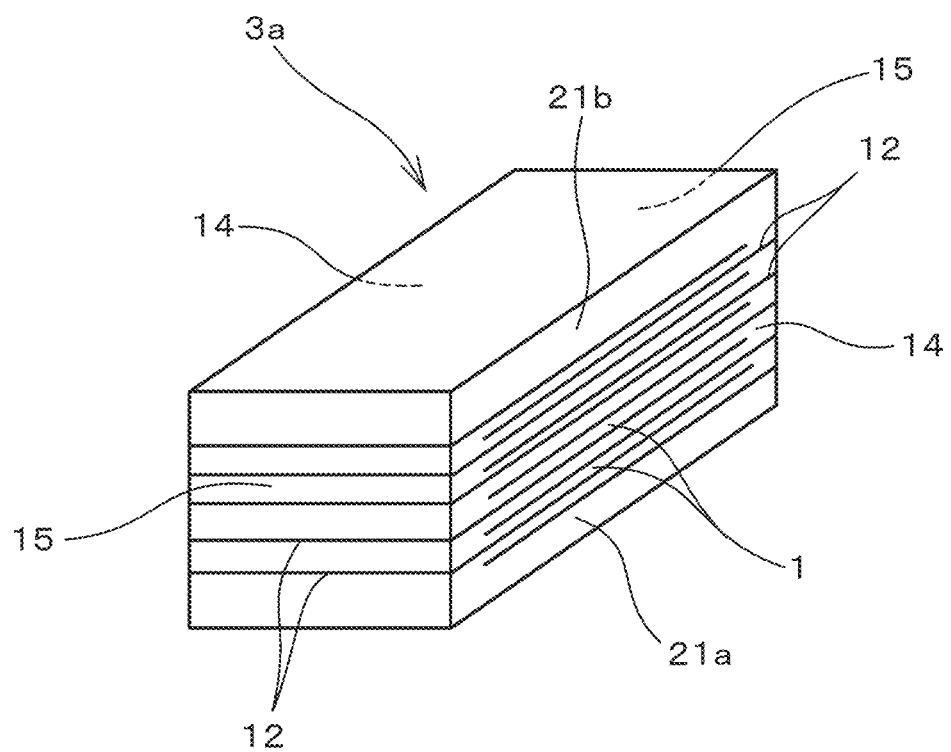
FIG. 8 is a diagram showing another step in the method of manufacturing a multilayer ceramic capacitor according to one embodiment of the present invention.

In forming the multilayer body, specifically, a prescribed number of ceramic green sheets 21a each having no internal electrode pattern formed thereon that form a lower main surface outer layer portion are layered, thereafter a prescribed number of above-described zero-height-difference sheets 1a each having internal electrode pattern 12 formed thereon are layered, and furthermore, a prescribed number of ceramic green sheets 21b each having no internal electrode pattern formed thereon that form an upper main surface outer layer portion are layered, and the sheets are pressure-bonded. Then, an unfired multilayer body 3a structured such that internal electrode patterns 12 are alternately drawn to opposing end surfaces 15 and internal electrode patterns 12 are exposed also at opposing side surfaces 14 is made as shown in FIG. 8.

Figure 9:
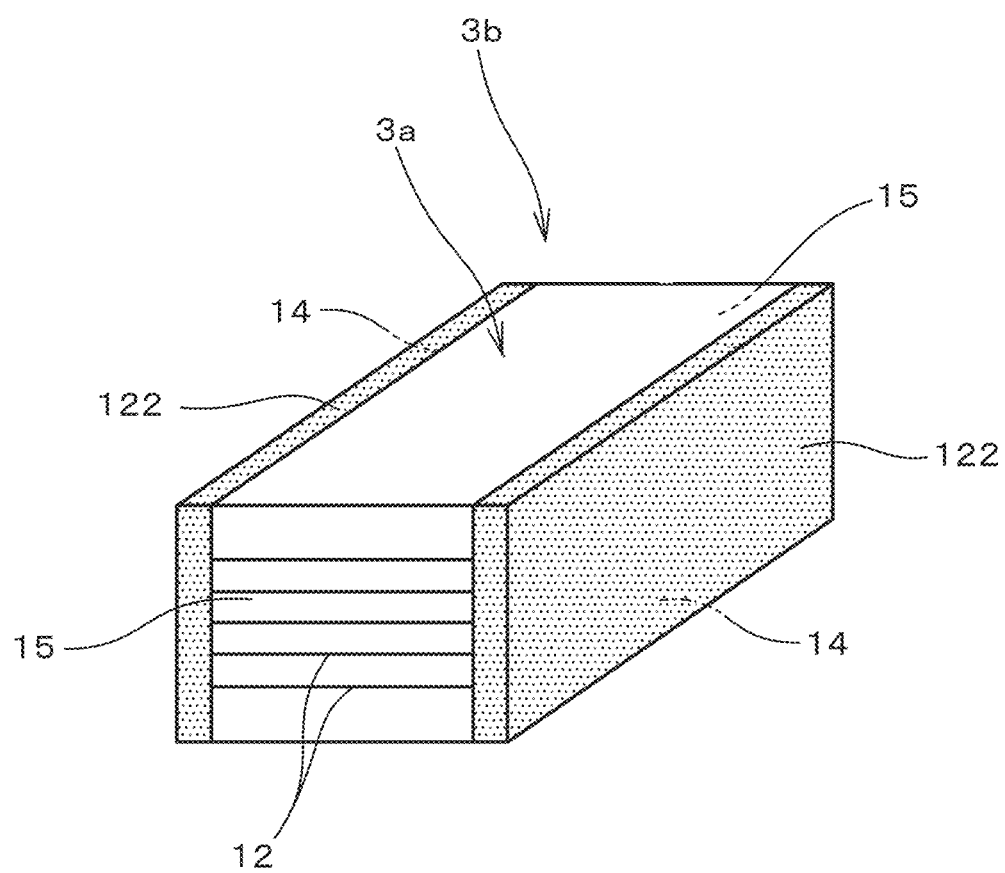
FIG. 9 is a diagram showing another step in the method of manufacturing a multilayer ceramic capacitor according to one embodiment of the present invention.

Then, as shown in FIG. 9, a ceramic green sheet 122 is bonded to opposing side surfaces 14 (FIG. 8) of unfired multilayer body 3a where internal electrode patterns 12 are exposed, to thereby obtain an unfired covered multilayer body 3b in which side surfaces 14 (FIG. 8) where internal electrode patterns 12 are exposed are covered with ceramic green sheets 122.

Then, unfired covered multilayer body 3b is fired to obtain fired multilayer body 3. Thereafter, multilayer ceramic capacitor 10 is obtained by forming first external electrode 4a on first end surface 15a of multilayer body 3 and forming second external electrode 4b on second end surface 15b to conduct to internal electrode layers 2 (2a and 2b) exposed at first end surface 15a and second end surface 15b of multilayer body 3 as shown in FIGS. 1 and 2.

Though a method of forming a single multilayer body 3 is described in the present embodiment, multilayer bodies can be manufactured, for example, by what is called a multi-production method, for example, of forming a mother multilayer body and dividing the mother multilayer body into individual multilayer bodies as will be described below.

Initially, a mother multilayer body is formed by layering in a prescribed manner, a prescribed number of mother green sheets for a lower outer layer portion each having no internal electrode pattern formed thereon, a prescribed number of mother green sheets each having a mother internal electrode pattern like a belt to be internal electrodes for a plurality of multilayer bodies formed thereon, and a prescribed number of mother green sheets for an upper outer layer portion each having no internal electrode pattern formed thereon.

Then, the mother multilayer body is divided at prescribed positions to make unfired multilayer bodies 3a in such a structure that internal electrode patterns 12 are alternately drawn to opposing end surfaces 15 and internal electrode patterns 12 are exposed also at opposing side surfaces 14 as shown in FIG. 8.

Then, as shown in FIG. 9, individual multilayer ceramic capacitors are made by bonding ceramic green sheet 122 on each of opposing side surfaces 14 of unfired multilayer body 3a, firing the multilayer body, and thereafter forming the external electrode.

In this method, in dividing the mother multilayer body at prescribed positions, the mother internal electrode pattern like the belt described above is cut at a plurality of prescribed positions in a direction orthogonal to a longitudinal direction. Thus, as shown in FIG. 8, individual unfired multilayer bodies 3a where internal electrode patterns 12 are exposed also at the side surfaces are formed.

The multilayer ceramic capacitors are generally manufactured by such a multi-production method, and the multilayer ceramic capacitors according to the present invention can also efficiently be manufactured by this multi-production method.

Figure 3:
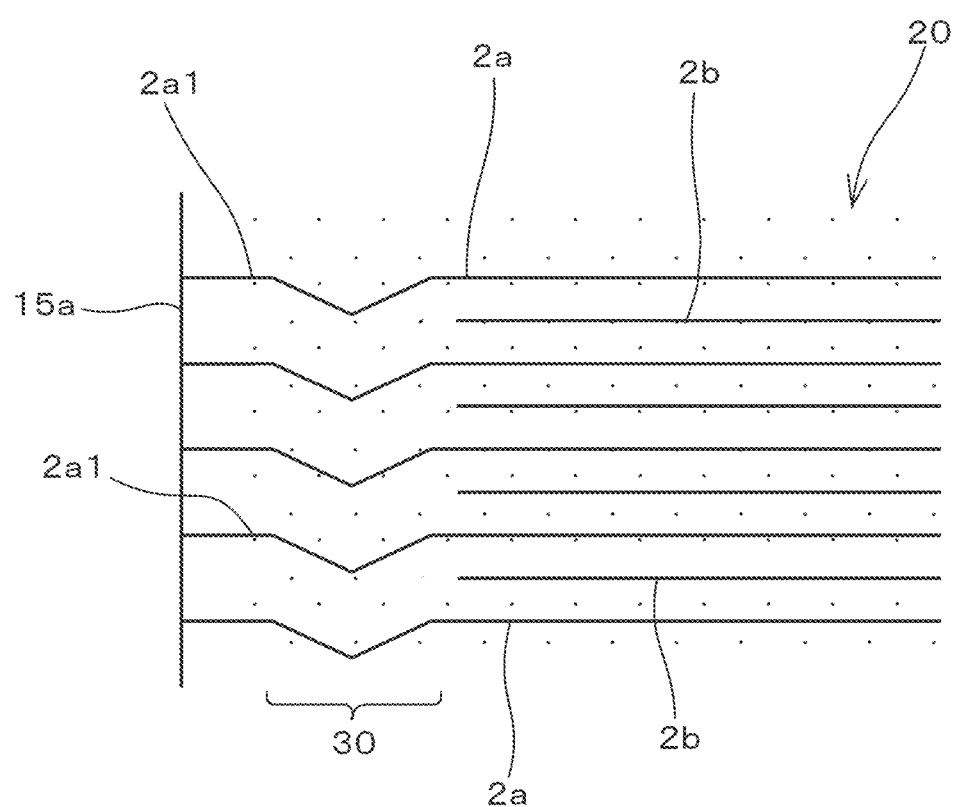
FIG. 3 is a diagram schematically showing a form of an internal electrode layer of the multilayer ceramic capacitor according to one embodiment of the present invention.

In multilayer ceramic capacitor 10 according to the present embodiment, multilayer body 3 is formed from ceramic green sheet (zero-height-difference sheet) 1a with no height difference between the region where internal electrode pattern 12 to be internal electrode layer 2 after firing is formed and the region where no internal electrode pattern 12 is formed on ceramic green sheet 11 as described above. As schematically shown in FIG. 3, however, a bent portion 30 is formed at a drawn portion 2a1 of first internal electrode layer 2a drawn to first end surface 15a. Though reasons therefor are not necessarily clear, it is estimated that bent portion 30 as described above is formed in a pressure bonding step due to strain originating from a gap provided between internal electrode pattern 12 in FIG. 6B and ceramic paste layer 11a for eliminating a height difference between the region where internal electrode pattern 12 is formed and the region where no internal electrode pattern is formed therearound. Bent portion 30 is a factor for fracture or chipping or lowering in high-temperature load reliability in a conventional multilayer ceramic capacitor without features of the present invention which will be described later.

In multilayer ceramic capacitor 10 according to the present embodiment, dielectric ceramic layer 1 in an effective portion 20 which is a region where internal electrode layers 2 are layered on one another when viewed in layering direction T is composed of a ceramic material containing Ba, Ti, Mn, and Si. More specifically, dielectric ceramic layer 1 is composed of a ceramic material mainly composed of $BaTiO_3$, containing Mn and Si, containing holmium (Ho) as a rare earth element, and further containing V and Zr as trace elements.

Though holmium (Ho) is employed as a rare earth element in the present embodiment, another rare earth element such as dysprosium (Dy), yttrium (Y), or lanthanoid other than holmium (Ho) can also be employed alone or in combination.

Internal electrode layer 2, that is, first internal electrode layer 2a and second internal electrode layer 2b, is composed of a material containing Ni as a main metal material. Internal electrode layer 2 may contain, other than Ni, a metal such as Cu, Ag, Pd, Ti, Cr, and Au or an alloy of these metals. Internal electrode layer 2 may contain as a common material, a dielectric composition such as dielectric ceramic particles identical or similar in composition to ceramics contained in dielectric ceramic layer 1.

In multilayer ceramic capacitor 10 according to the present embodiment, external electrode 4, that is, first external electrode 4a and second external electrode 4b, includes a first Ni layer 41 which is an underlying electrode layer and a second Ni layer 42 which is a plated layer formed on first Ni layer 41.

First Ni layer 41 that forms external electrode 4 is formed, for example, by applying a conductive paste containing glass and mainly composed of Ni as a conductive component and baking the conductive paste.

Second Ni layer 42 that forms external electrode 4 is formed by plating a surface of first Ni layer 41 which is the underlying electrode layer with Ni.

External electrode 4 includes first Ni layer 41 which is a baked electrode as an underlying electrode and includes on a surface thereof, second Ni layer 42 which is the plated layer. Thus, a highly reliable multilayer ceramic capacitor including an external electrode which is high in strength of joint to multilayer body 3, has a dense surface, and is excellent in resistance to moisture can be obtained.

Baking of a conductive paste in forming first Ni layer 41 may be carried out simultaneously with firing of multilayer body 3. Alternatively, after firing of multilayer body 3, a conductive paste may be applied to multilayer body 3 and thereafter the conductive paste may be baked.

First Ni layer 41 which is the underlying electrode layer contains as a common material, at a ratio not lower than 25 area % and not higher than 40 area %, a dielectric composition, that is, dielectric ceramic particles in the present embodiment, identical or similar in composition to dielectric ceramics that forms dielectric ceramic layer 1.

By thus containing at a ratio not lower than 25 area %, the common material in first Ni layer 41 which is the underlying electrode layer, the external electrode can be closer in such a physical property as a coefficient of expansion to the multilayer body, occurrence of a defect such as a crack can be suppressed, and reliability can be improved. A ratio of the common material higher than 40 area %, however, may lead to lowering in conductivity. Therefore, the ratio desirably does not exceed 40 area %.

A material for external electrode 4 or a method of forming external electrode 4 is not limited to that in the example described above. The external electrode can be formed of various materials to be used for an electrode with various known methods.

Solderability of external electrode 4 can also be improved by forming an Sn layer or a solder layer on second Ni layer 42, for example, by plating.

Figure 4:
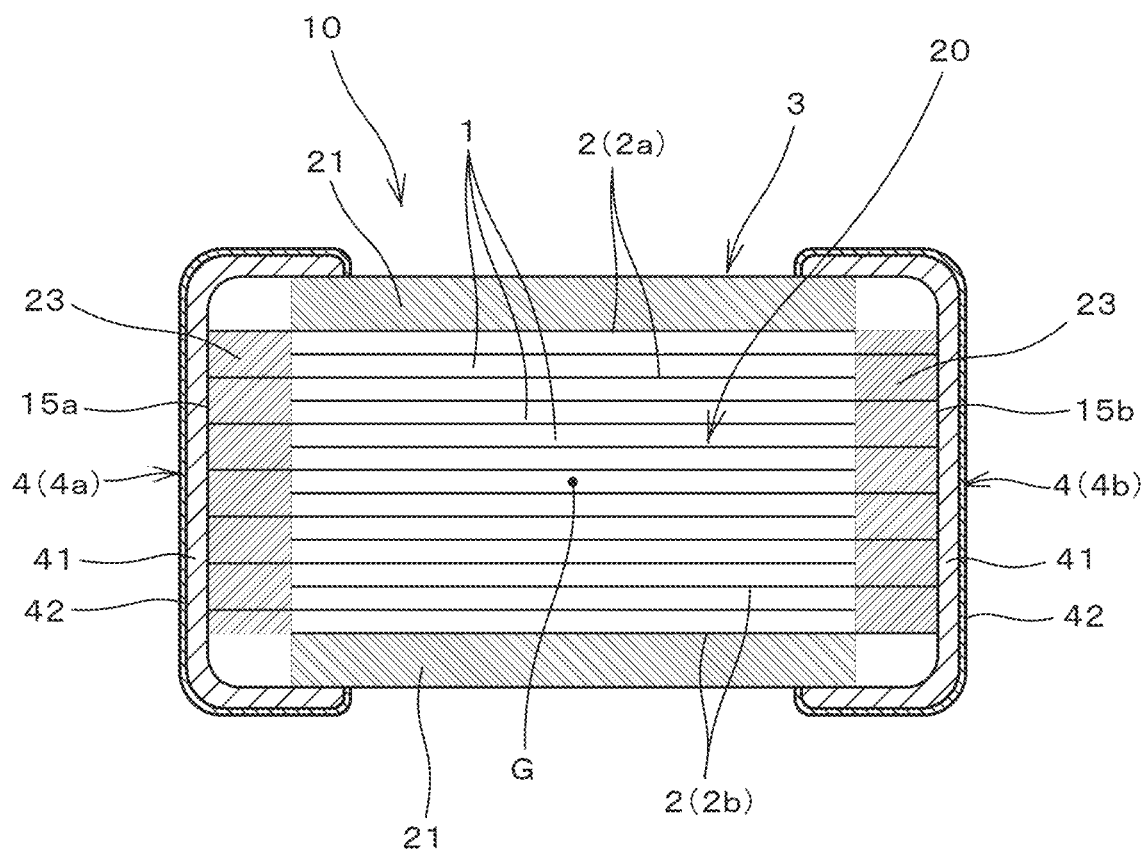
FIG. 4 is a diagram illustrating a position of a main surface outer layer portion and an end surface outer layer portion of the multilayer ceramic capacitor according to one embodiment of the present invention.
Figure 5:
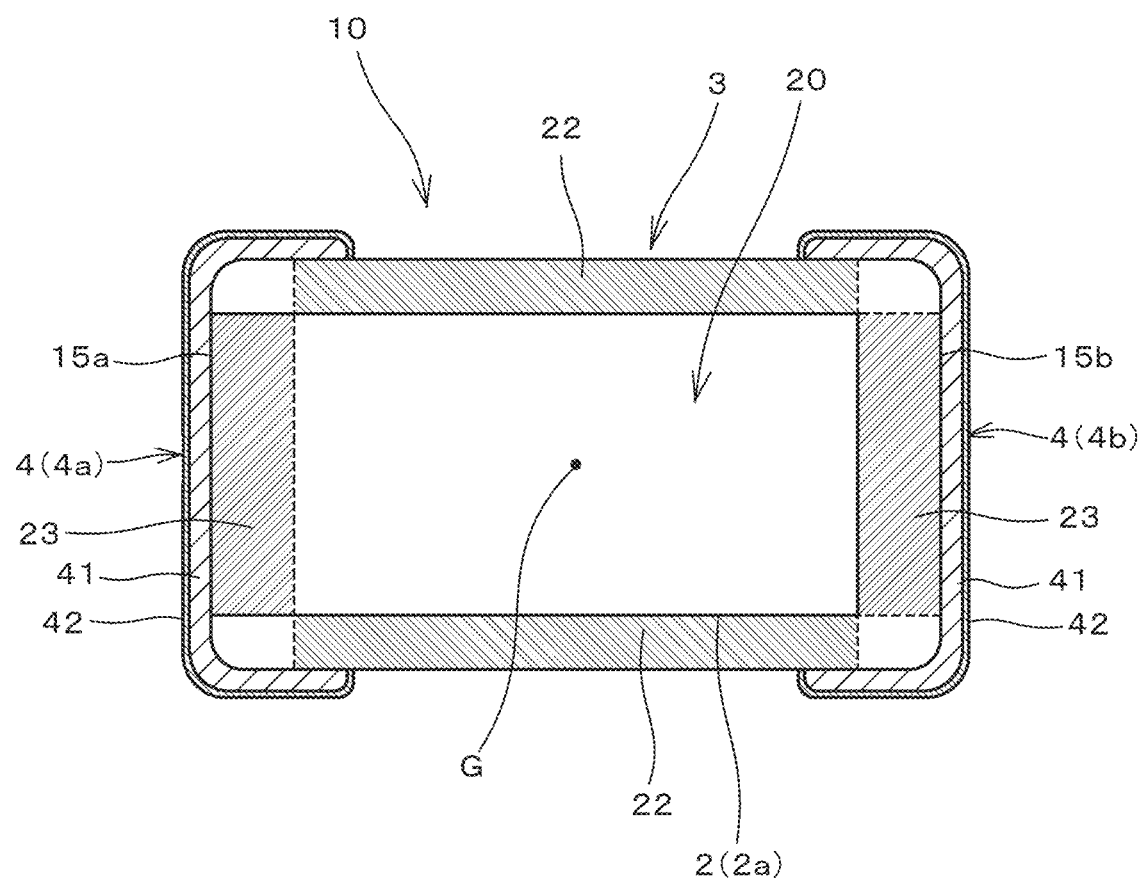
FIG. 5 is a diagram illustrating a position of a side surface outer layer portion and the end surface outer layer portion of the multilayer ceramic capacitor according to one embodiment of the present invention.

In multilayer ceramic capacitor 10 according to the present invention, as shown in FIGS. 4 and 5, when a region where internal electrode layers 2 are layered on one another when viewed in layering direction T is defined as effective portion 20, with regions between which effective portion 20 lies in layering direction T each being defined as a main surface outer layer portion 21, with regions between which effective portion 20 lies in width direction W each being defined as a side surface outer layer portion 22, and with regions between which effective portion 20 lies in length direction L each being defined as an end surface outer layer portion 23, an Mn/Ti peak intensity ratio which is a ratio of peak intensity of Mn found by laser ICP to peak intensity of Ti found by laser ICP in the dielectric ceramic layer in end surface outer layer portion 23 is not lower than two times and not higher than fifteen times as high as the Mn/Ti peak intensity ratio which is a ratio of peak intensity of Mn found by laser ICP to peak intensity of Ti found by laser ICP in the dielectric ceramic layer in a central portion G in width direction W, length direction L, and layering direction T in effective portion 20, and an Ni/Ti peak intensity ratio which is a ratio of peak intensity of Ni found by TEM-EDX to peak intensity of Ti found by TEM-EDX in the dielectric ceramic layer in end surface outer layer portion 23 is not lower than one time and not higher than six times as high as the Ni/Ti peak intensity ratio which is a ratio of peak intensity of Ni found by TEM-EDX to peak intensity of Ti found by TEM-EDX in the dielectric ceramic layer in central portion G in effective portion 20.

With features specific to the present invention described above, a multilayer ceramic capacitor less likely to suffer from fracture or chipping and high in high-temperature load reliability can be obtained.

The reason why such an effect is achieved may be, for example, that (a) a ratio of Mn contained in the dielectric ceramic layer in end surface outer layer portion 23 is increased, that is, end surface outer layer portion 23 is higher in Mn/Ti peak ratio than central portion G in effective portion 20 so that sintering moderately proceeds, ceramic particles become smaller, and mechanical strength of multilayer body 3 is improved and (b) Ni in internal electrode layer 2 or Ni in external electrode 4 is diffused into ceramics so that Ni is present in the dielectric ceramic layer in end surface outer layer portion 23, which may lead to an unmatch in timing of sintering between effective portion 20 and end surface outer layer portion 23 different in content of Ni from each other, however, by setting a ratio of Ni contained in the dielectric ceramic layer in end surface outer layer portion 23 to be higher than a ratio of Ni contained in central portion G in effective portion 20, that is, by setting the Ni/Ti peak intensity ratio in end surface outer layer portion 23 to be at least one time and at most six times as high as the Ni/Ti peak intensity ratio in central portion G in effective portion 20, timing of sintering can be closer and multilayer body 3 high in mechanical strength can be obtained. In addition, since Ni inhibits migration of acceptors, reliability can be improved as a whole by containing Ni in a region other than the effective portion.

Furthermore, in multilayer ceramic capacitor 10 according to the present invention, the dielectric ceramic layer in side surface outer layer portion 22 contains Si, and preferably, it contains Si in such a manner that an Si/Ti peak intensity ratio which is a ratio of peak intensity of Si found by TEM-EDX to peak intensity of Ti found by TEM-EDX gradually becomes lower from side surface outer layer portion 22 toward effective portion 20 in width direction W.

Thus, when Si is contained in such a manner that the Si/Ti peak intensity ratio gradually becomes lower from side surface outer layer portion 22 toward effective portion 20, an effect of promoted growth of grains of dielectric ceramics and improvement in high-temperature load reliability can be obtained. Specifically, in a region closer to a surface of side surface outer layer portion 22, a content of Si is high and hence with growth of grains of dielectric ceramics, denseness of the surface or mechanical strength is improved, occurrence of fracture or chipping is suppressed, and high-temperature load reliability is improved. In a region close to the effective portion, on the other hand, the content of Si is low and joint to the effective portion is improved, and hence improvement in reliability can be expected also in this aspect.

For Si, in consideration of the fact that Si is a light element and hence accuracy is low in measurement by laser ICP, measurement for Si and Ti a ratio to which is to be calculated is conducted with TEM-EDX.

An outer region in side surface outer layer portion 22 contains approximately 0.5 to 10 mol % of Si. When side surface outer layer portion 22 is divided into five equal regions in the width direction, an innermost region in side surface outer layer portion 22 (a region close to central portion G in effective portion 20) desirably contains Si at a ratio approximately 1/3 to 1/10 the ratio in the outer region in side surface outer layer portion 22.

For example, a method of filling a gap created at a height difference portion between the internal electrode and the dielectric ceramic layer at an end surface with a ceramic paste and employing as the ceramic paste, a ceramic paste higher in ratio of Mn to Ti than that for a ceramic green sheet to be the dielectric ceramic layer included in the effective portion can be applied as a method of setting the Mn/Ti peak intensity ratio found by laser ICP in the dielectric ceramic layer in end surface outer layer portion 23 to be at least two times and at most fifteen times as high as the Mn/Ti peak intensity ratio in the dielectric ceramic layer in central portion G in effective portion 20.

For example, a method of employing a material containing Ni as a constituent material for external electrode 4 or the internal electrode formed in end surface outer layer portion 23 and diffusing Ni to the end surface outer layer portion during firing is applicable as a method of setting the Ni/Ti peak intensity ratio in the dielectric ceramic layer in end surface outer layer portion 23 to be within a range not lower than one time and not higher than six times as high as the Ni/Ti peak intensity ratio in the dielectric ceramic layer in central portion G in effective portion 20.

For example, a method of filling a gap created at a height difference portion between the internal electrode and the dielectric ceramic layer at an end surface with a ceramic paste, employing as the ceramic paste, a ceramic paste higher in ratio of Ni to Ti than that for a ceramic green sheet to be the dielectric ceramic layer included in the effective portion, and diffusing Ni during firing can also be applied.

For example, a method of providing a concentration gradient of Si in side surface outer layer portion 22 by preparing as ceramic green sheets that form the dielectric ceramic layer in side surface outer layer portion 22, (1) a first ceramic green sheet that contains no Si or contains Si at a low ratio and is excellent in joint to effective portion 20 and (2) a second ceramic green sheet to be the dielectric ceramic layer that contains more Si than the first ceramic green sheet and will be a dielectric ceramic layer high in mechanical strength after firing, disposing the first ceramic green sheet on the inner side and disposing the second ceramic green sheet on the outer side thereof, and firing the ceramic green sheets can be applied as the method of realizing the construction that side surface outer layer portion 22 contains Si in such a manner that the Si/Ti peak intensity ratio is gradually lower from side surface outer layer portion 22 toward effective portion 20 in width direction W. A single first ceramic green sheet and a single second ceramic green sheet may be prepared, or at least one of the first and second ceramic green sheets may be prepared in any multiple numbers.

In the present invention, presence of Ni is confirmed by detection of peak intensity by TEM-EDX as described above.

This is done so because, in the case of Ni, a spot diameter is large in measurement by laser ICP and accurate measurement is difficult. Thus, measurement with TEM-EDX is conducted.

Relation between Mn and Ti is defined based on the Mn/Ti peak intensity ratio found by laser ICP.

The multilayer ceramic capacitor in each of Examples 1 to 17 meeting the requirements in the present invention and the multilayer ceramic capacitor in each of Comparative Examples 1 to 19 not meeting the requirements in the present invention were made in the present embodiment. Then, these multilayer ceramic capacitors were examined. Table 1 shows a value of the peak intensity ratio in each portion below.

(1) A value of the Mn/Ti peak intensity ratio which is a ratio of peak intensity of Mn found by laser ICP (laser emission spectrometry) to peak intensity of Ti found by laser ICP in the effective portion and the end surface outer layer portion (2) A value of the Ni/Ti peak intensity ratio which is a ratio of peak intensity of Ni found by TEM-EDX to peak intensity of Ti found by TEM-EDX in the effective portion and the end surface outer layer portion

TABLE 1

| | Mn/Ti Peak Intensity Ratio | | Ni/Ti Peak Intensity Ratio | | Fracture and Chipping Count N = 100 | MTTF (Time) 120° C. 6.3 V | Short-Circuiting Occurrence N = 100 |
|---|---|---|---|---|---|---|---|
| | Effective Portion | End Surface Outer Layer Portion | Effective Portion | End Surface Outer Layer Portion | | | |
| Comparative Example 1 | 1 | 1 | 0 | 0 | 21 | 6 | 0% |
| Example 1 | 1 | 2 | 1 | 1 | 0 | 23 | 0% |
| Example 2 | 1 | 2 | 1 | 3 | 0 | 36 | 0% |
| Example 3 | 1 | 2 | 1 | 5 | 0 | 35 | 0% |
| Example 4 | 1 | 2 | 1 | 6 | 0 | 40 | 0% |
| Comparative Example 2 | 1 | 2 | 1 | 7 | 0 | 20 | 15% |
| Comparative Example 3 | 1 | 2 | 1 | 8 | 0 | 15 | 25% |
| Comparative Example 4 | 1 | 5 | 1 | 0 | 0 | 8 | 0% |
| Example 5 | 1 | 5 | 1 | 1 | 0 | 23 | 0% |
| Example 6 | 1 | 5 | 1 | 3 | 0 | 43 | 0% |
| Example 7 | 1 | 5 | 1 | 5 | 0 | 45 | 0% |
| Example 8 | 1 | 5 | 1 | 6 | 0 | 42 | 0% |
| Comparative Example 5 | 1 | 5 | 1 | 7 | 0 | 23 | 17% |

TABLE 1-continued

| | Mn/Ti Peak Intensity Ratio | | Ni/Ti Peak Intensity Ratio | | Fracture and Chipping Count N = 100 | MTTF (Time) 120° C. 6.3 V | Short-Circuiting Occurrence N = 100 |
|---|---|---|---|---|---|---|---|
| | Effective Portion | End Surface Outer Layer Portion | Effective Portion | End Surface Outer Layer Portion | | | |
| Comparative Example 6 | 1 | 5 | 1 | 8 | 0 | 17 | 23% |
| Comparative Example 7 | 1 | 10 | 1 | 0 | 0 | 7 | 0% |
| Example 10 | 1 | 10 | 1 | 1 | 0 | 25 | 0% |
| Example 11 | 1 | 10 | 1 | 3 | 0 | 46 | 0% |
| Example 12 | 1 | 10 | 1 | 5 | 0 | 46 | 0% |
| Example 13 | 1 | 10 | 1 | 6 | 0 | 48 | 0% |
| Comparative Example 8 | 1 | 10 | 1 | 7 | 0 | 21 | 16% |
| Comparative Example 9 | 1 | 10 | 1 | 8 | 0 | 18 | 21% |
| Comparative Example 10 | 1 | 15 | 0 | 0 | 0 | 9 | 0% |
| Example 14 | 1 | 15 | 1 | 1 | 0 | 34 | 0% |
| Example 15 | 1 | 15 | 1 | 3 | 0 | 48 | 0% |
| Example 16 | 1 | 15 | 1 | 5 | 0 | 49 | 0% |
| Example 17 | 1 | 15 | 1 | 6 | 0 | 47 | 0% |
| Comparative Example 11 | 1 | 15 | 1 | 7 | 0 | 48 | 21% |
| Comparative Example 12 | 1 | 15 | 1 | 8 | 0 | 47 | 25% |
| Comparative Example 13 | 1 | 20 | 0 | 0 | 4 | 10 | 0% |
| Comparative Example 14 | 1 | 20 | 1 | 1 | 2 | 37 | 0% |
| Comparative Example 15 | 1 | 20 | 1 | 3 | 5 | 41 | 0% |
| Comparative Example 16 | 1 | 20 | 1 | 5 | 5 | 45 | 0% |
| Comparative Example 17 | 1 | 20 | 1 | 6 | 3 | 48 | 0% |
| Comparative Example 18 | 1 | 20 | 1 | 7 | 4 | 23 | 17% |
| Comparative Example 19 | 1 | 20 | 1 | 8 | 2 | 13 | 23% |

The peak intensity ratio in Table 1 was specifically found by a method which will be described below.

Initially, multilayer ceramic capacitor 10 was cut along width direction W and layering direction T in central portion G in length direction L (see FIGS. 2, 4, and 5) to expose the cross-section of effective portion 20. Then, a region of a field of view of 15 μm×15 μm substantially at the center of the exposed cross-section, that is, central portion G in FIG. 2, was analyzed for Ti and Mn by laser ICP and the peak intensity ratio thereof was calculated.

As described above, in connection with relation between Ni and Ti, peak intensity of Ni was examined by TEM-EDX and peak intensity of Ti a ratio to which was to be calculated was also examined by TEM-EDX.

Peak intensity of each component in the dielectric ceramic layer in the end surface outer layer portion was measured in the end surface outer layer portion, at the surface exposed by cutting along width direction W and layering direction T at central portion G (see FIGS. 2, 4, and 5) in length direction L, as in measurement of peak intensity in effective portion 20.

A value of the Mn/Ti peak intensity ratio found by laser ICP in the effective portion and the end surface outer layer portion in Table 1 is not expressed as a value as it is of the Mn/Ti peak intensity ratio but is expressed as a value given by standardizing the Mn/Ti peak intensity ratio in the end surface outer layer portion with the Mn/Ti peak intensity ratio in the effective portion being defined as 1.

A value of the Ni/Ti peak intensity ratio found by TEM-EDX in the effective portion and the end surface outer layer portion in Table 1 is not expressed as the value as it is of the Ni/Ti peak intensity ratio found by TEM-EDX either but is expressed as a value given by standardizing the Ni/Ti peak intensity ratio in the end surface outer layer portion with the Ni/Ti peak intensity ratio in the effective portion being defined as 1.

In the present embodiment, for the multilayer ceramic capacitors representing Examples 1 to 17 meeting the requirements in the present invention and the multilayer ceramic capacitors representing Comparative Examples 1 to 19 not meeting the requirements in the present invention, a state of occurrence of fracture and chipping (count), mean time to failure (MTTF) which is an indicator for determination as to high-temperature load reliability, and short-circuiting occurrence were examined. Table 1 also shows results thereof.

Fracture and chipping refers to an externally recognizable defect (an apparent structural defect) having a maximum diameter not smaller than 50 μm. Table 1 shows the number of samples among one hundred samples in which occurrence of a defect having a maximum diameter not smaller than 50 μm was observed as a result of visual inspection.

Mean time to failure (MTTF) which is an indicator for determination as to high-temperature load reliability is expressed as an average value of times until occurrence of failure such as short-circuiting or deterioration of insulating resistance by application of a voltage of 6.3 V to thirty samples in a high-temperature atmosphere at 120° C. When the mean time to failure (MTTF) is shorter than a prescribed time period, high-temperature load reliability is determined as "not good" (see Table 1).

For example, when the dielectric ceramic layer is designed to have a thickness of 0.5 μm, the prescribed time period is set to twenty-five hours, and when the dielectric ceramic layer is designed to have a thickness of 0.4 μm, the prescribed time period is set to twenty hours. Since the dielectric ceramic layer has the thickness of approximately 0.5 μm in the present embodiment, high-temperature load reliability is evaluated as "not good" when the MTTF is shorter than twenty-three hours. Among the samples in Examples meeting the requirements in the present invention, there was no sample MTTF of which was shorter than twenty-three hours and no sample was evaluated as "not good."

The short-circuiting occurrence in Table 1 represents a result of examination of a state of occurrence of short-circuiting in the sample in each of Examples and Comparative Examples made in the present embodiment, in a stage prior to a test for examining high-temperature load reliability (MTTF).

In the present embodiment, the sample in which occurrence of short-circuiting was not observed in the test for examining the short-circuiting occurrence was subjected to a high-temperature load reliability test for measuring the mean time to failure (MTTF) described above.

As shown in Table 1, any of fracture and chipping, poor high-temperature load reliability, and occurrence of a short-circuiting defect was observed in the multilayer ceramic capacitors in Comparative Examples 1 to 19 not meeting the characteristic requirements in the present invention, whereas fracture and chipping, poor high-temperature load reliability, or occurrence of a short-circuiting defect was not observed in the multilayer ceramic capacitors according to the present embodiment.

It can be seen from results described above that a multilayer ceramic capacitor less likely to suffer from fracture and chipping and high in high-temperature load reliability can be obtained by meeting such requirements that the Mn/Ti peak intensity ratio in end surface outer layer portion 23 is not lower than two times and not higher than fifteen times as high as the Mn/Ti peak intensity ratio in central portion G in effective portion 20 and the Ni/Ti peak intensity ratio in end surface outer layer portion 23 is not lower than one time and not higher than six times as high as the Ni/Ti peak intensity ratio in central portion G in effective portion 20.

When the Ni/Ti peak intensity ratio (the peak intensity ratio found by TEM-EDX) in the end surface outer layer portion exceeds six times as high as the Ni/Ti peak intensity ratio (the peak intensity ratio found by TEM-EDX) in the central portion in the effective portion, Ni is precipitated as a metal component, an insulating resistance between the internal electrodes deteriorates, and short-circuiting may occur. Therefore, a range not higher than six times is preferred.

In the embodiment, since the dielectric ceramic layer is composed of ceramics mainly composed of $BaTiO_3$, a content of Ti in the dielectric ceramic layer is approximately 20 mol %. In an example where Ti is contained at such a ratio, effects of the present invention can reliably be obtained by meeting such requirements that the Mn/Ti peak intensity ratio in end surface outer layer portion 23 is not lower than two times and not higher than fifteen times as high as the Mn/Ti peak intensity ratio in central portion G in effective portion 20 and the Ni/Ti peak intensity ratio in end surface outer layer portion 23 is not lower than one time and not higher than six times as high as the Ni/Ti peak intensity ratio in central portion G in effective portion 20.

Figure 10A:
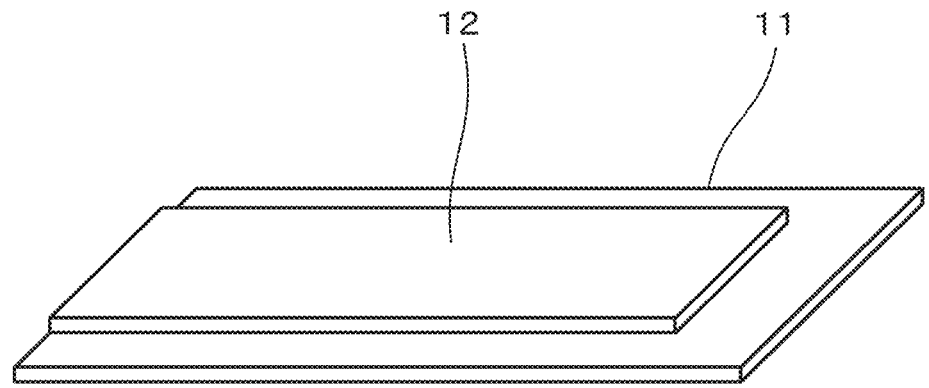
FIG. 10A is a diagram of a state before formation of the ceramic paste layer in the method of making a zero-height-difference sheet in a modification.
Figure 10B:
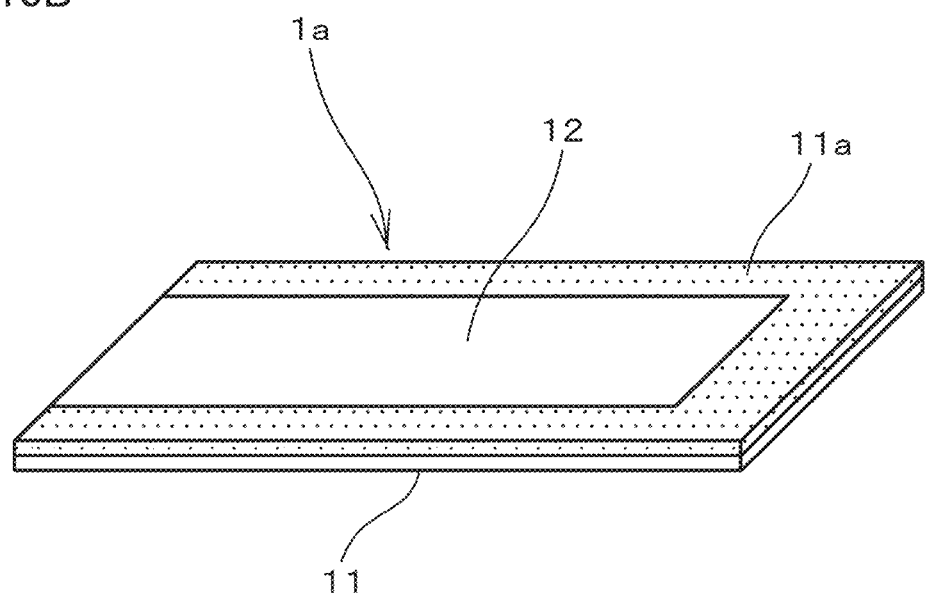
FIG. 10B is a diagram of a state after formation of the ceramic paste layer in the method of making a zero-height-difference sheet in the modification.

In the embodiment, as shown in FIG. 6B, a ceramic green sheet, that is, zero-height-difference sheet, 1a, with no height difference between the region where internal electrode pattern 12 is formed and the region where no internal electrode pattern 12 is formed as a result of formation of ceramic paste layer 11a in a region where no internal electrode pattern 12 is formed, that is, in a region on one end side in the longitudinal direction of ceramic green sheet 11, is employed as zero-height-difference sheet 1a. For example, however, zero-height-difference sheet 1a with no height difference between the region where internal electrode pattern 12 is formed and a region therearound where no internal electrode pattern 12 is formed as a result of arrangement of ceramic paste layer 11a around internal electrode pattern 12 formed on the surface of ceramic green sheet 11 as shown in FIG. 10B in such a manner that only one side is drawn to the end of ceramic green sheet 11 as shown in FIG. 10A can also be employed. When zero-height-difference sheet 1a shown in FIG. 10B is employed, no internal electrode pattern is exposed at the side surface of the obtained multilayer body and hence a ceramic sheet for covering does not have to be bonded to the side surface of the multilayer body.

In employing zero-height-difference sheet 1a shown in FIG. 10B as well, what is called a multi-production method of forming a mother multilayer body from a mother green sheet where a large number of internal electrode patterns are formed in matrix and cutting the mother multilayer body at prescribed positions to divide the mother multilayer body into individual multilayer bodies can be applied. In this case, since no internal electrode pattern is exposed at the side surface of the obtained individual multilayer body, a ceramic sheet does not have to be bonded to the side surface of the multilayer body as described above.

The present invention may be able to achieve suppression of occurrence of fracture or chipping and improvement in high-temperature load reliability also when it is applied to a multilayer ceramic capacitor manufactured from a ceramic green sheet with a height difference between the region where the internal electrode pattern is formed and the region where no internal electrode pattern is formed, that is, a ceramic green sheet where no ceramic paste layer for eliminating a height difference is provided, without being limited to the multilayer ceramic capacitor including what is called a zero-height-difference sheet described above.

A dimension of each portion of the multilayer ceramic capacitor preferred for application of the present invention will now be described.

For example, preferred dimensions of the multilayer ceramic capacitor are exemplified below.

<Dimension of Each Portion of Multilayer Ceramic Capacitor>

(Type 1)

Dimension in length direction L: not smaller than 0.32 mm and not larger than 0.36 mm Dimension in width direction W: not smaller than 0.25 mm and not larger than 0.30 mm Dimension in layering direction T: not smaller than 0.25 mm and not larger than 0.30 mm Thickness of dielectric ceramic layer: not smaller than 0.35 μm and not larger than 0.6 μm Thickness of internal electrode layer: not smaller than 0.2 μm and not larger than 0.4 μm The thickness of the dielectric ceramic layer and the internal electrode layer is an average thickness of the dielectric ceramic layers and the internal electrode layers in the effective portion.

(Type 2)

Dimension in length direction L: not smaller than 0.1 mm and not larger than 0.12 mm Dimension in width direction W: not smaller than 0.63 mm and not larger than 0.68 mm Dimension in layering direction T: not smaller than 0.62 mm and not larger than 0.68 mm Thickness of dielectric ceramic layer: not smaller than 0.35 µm and not larger than 0.6 µm Thickness of internal electrode layer: not smaller than 0.2 µm and not larger than 0.4 µm The thickness of the dielectric ceramic layer and the internal electrode layer is an average thickness of the dielectric ceramic layers and the internal electrode layers in the effective portion.

In the multilayer ceramic capacitor according to the present invention, regardless of its outer dimension, the internal electrode layer has a thickness preferably not larger than 0.4 µm and more preferably not larger than 0.3 µm.

By having the thickness of the internal electrode layer at 0.4 µm or smaller, the layer can be smaller in thickness, a capacitance can be higher, and peel-off due to difference in shrinkage between the internal electrode and the dielectric layer can be prevented.

By having the thickness of the internal electrode layer at 0.3 µm or smaller, peel-off can more reliably be prevented. From a point of view of ensuring coverage of the internal electrode layer, the thickness is normally desirably not smaller than 0.2 µm.

In the multilayer ceramic capacitor according to the present invention, the dielectric ceramic layer has a thickness preferably not larger than 0.6 µm. By setting the thickness of the dielectric ceramic layer to 0.6 µm or smaller, the multilayer ceramic capacitor high in capacitance can be obtained.

From a point of view of preventing short-circuiting between the internal electrode layers or lowering in high-temperature load reliability, the dielectric ceramic layer normally has a thickness preferably not smaller than 0.1 µm.

<Method of Measuring Thickness of Dielectric Ceramic Layer and Internal Electrode Layer>

A method of measuring a thickness of the dielectric ceramic layer and the internal electrode layer will now be described.

Figure 11:
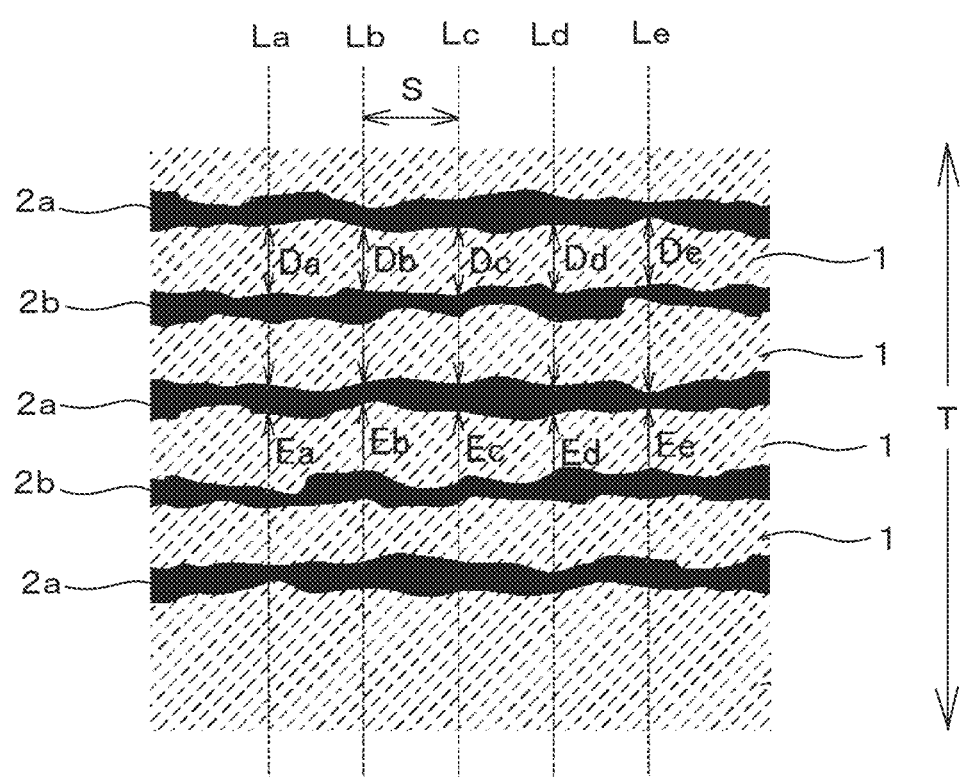
FIG. 11 is a diagram illustrating a method of measuring a thickness of a dielectric ceramic layer and an internal electrode layer.

For example, in measuring a thickness of the dielectric ceramic layer, as shown in FIG. 11, a plurality of straight lines La, Lb, Lc, and Ld, and a straight line Le are drawn at prescribed intervals S, a thickness Da on straight line La, a thickness Db on straight line Lb, a thickness Dc on straight line Lc, a thickness Dd on straight line Ld, and a thickness De on straight line Le are measured, and an average value thereof is defined as the thickness of the dielectric ceramic layer.

Similarly, in measuring a thickness of the internal electrode layer, as shown in FIG. 11, a thickness Ea on straight line La, a thickness Eb on straight line Lb, a thickness Ec on straight line Lc, a thickness Ed on straight line Ld, and a thickness Ee on straight line Le are measured, and an average value thereof is defined as the thickness of the internal electrode layer.

For example, in calculating an average thickness of a plurality of dielectric ceramic layers, the thickness is measured with the method above for each of five dielectric ceramic layers inclusive of the dielectric ceramic layer located substantially in the center in layering direction T and two dielectric ceramic layers located on each of opposing sides thereof, and an average value thereof is defined as the average thickness of the plurality of dielectric ceramic layers. In calculating an average thickness of a plurality of internal electrode layers, the thickness is measured with the method above for each of five internal electrode layers inclusive of the internal electrode layer located substantially in the center in layering direction T and two internal electrode layers located on each of opposing sides thereof, and an average value thereof is defined as the average thickness of the plurality of internal electrode layers. When the number of layered dielectric ceramic layers (internal electrode layers) is smaller than five, the thicknesses of all dielectric ceramic layers and internal electrode layers are measured with the method above and an average value thereof is defined as the average thickness of the plurality of dielectric ceramic layers and the internal electrode layers.

<Method of Measuring Common Material in External Electrode>

A content, that is, an area ratio, of a ceramic material which is a common material in the first Ni layer which is the underlying electrode layer is measured with a method below with the use of a wavelength dispersive X-ray spectroscope (WDX). Initially, a cross-section of a central area in width direction W of multilayer ceramic capacitor 10 is exposed and a central area in a thickness dimension of the first Ni layer which is the underlying electrode layer in a central area in layering direction T of multilayer body 3 is magnified at 10000×. A field of view of the magnified area is set to 6 µm×8 µm. The magnified area is mapped by WDX and the area ratio (area %) in an image obtained by mapping is measured.

Though an embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. A multilayer ceramic capacitor comprising:
    a multilayer body including a plurality of dielectric ceramic layers and a plurality of internal electrode layers that are alternately layered,
    the plurality of dielectric ceramic layers containing at least Ba, Ti, and Mn,
    the multilayer body defining:
        a first main surface and a second main surface opposed to each other in a direction of layering of the plurality of dielectric ceramic layers and the plurality of internal electrode layers,
        a first side surface and a second side surface opposed to each other in a width direction, the width direction being a direction orthogonal to both of the direction of layering and a direction of drawing of the plurality of internal electrode layers to a surface of the multilayer body, and
        a first end surface and a second end surface opposed to each other in a length direction, the length direction being a direction orthogonal to both of the direction of layering and the width direction,
    a first external electrode on the first end surface and electrically connected to a first set of internal electrode layers of the plurality of internal electrode layers; and a second external electrode on the second end surface and electrically connected to a second set of internal electrode layers of the plurality of internal electrode layers, wherein the plurality of internal electrode layers and the first and second external electrodes containing at least Ni, a region where the internal electrode layers are layered on one another when viewed in the direction of layering is defined as an effective portion, regions between which the effective portion lies in the direction of layering each are a main surface outer layer portion, regions between which the effective portion lies in the width direction each are a side surface outer layer portion, regions between which the effective portion lies in the length direction each are an end surface outer layer portion, an end surface outer layer Mn/Ti peak intensity ratio, which is a ratio of a peak intensity of Mn found by laser ICP to a peak intensity of Ti found by laser ICP in the dielectric ceramic layer in the end surface outer layer portion, is not lower than two times and not higher than fifteen times as high as a central portion Mn/Ti peak intensity ratio, which is a ratio of a peak intensity of Mn found by laser ICP to a peak intensity of Ti found by laser ICP in the dielectric ceramic layer in a central portion in the width direction, the length direction, and the direction of layering in the effective portion, and an end surface outer layer Ni/Ti peak intensity ratio, which is a ratio of a peak intensity of Ni found by TEM-EDX to a peak intensity of Ti found by TEM-EDX in the dielectric ceramic layer in the end surface outer layer portion, is within a range not lower than one time and not higher than six times as high as a central portion Ni/Ti peak intensity ratio, which is a ratio of a peak intensity of Ni found by TEM-EDX to a peak intensity of Ti found by TEM-EDX in the dielectric ceramic layer in the central portion in the effective portion.

2. The multilayer ceramic capacitor according to claim 1, wherein a portion of the dielectric ceramic layer in the side surface outer layer portion contains Si, and a side surface outer layer Si/Ti peak intensity ratio, which is a ratio of a peak intensity of Si found by TEM-EDX to the peak intensity of Ti found by TEM-EDX, continuously lowers from the side surface outer layer portion toward the effective portion in the width direction.

3. The multilayer ceramic capacitor according to claim 2, wherein the internal electrode layer has a thickness not larger than 0.4 μm.

4. The multilayer ceramic capacitor according to claim 3, wherein the dielectric ceramic layer has a thickness not larger than 0.6 μm.

5. The multilayer ceramic capacitor according to claim 2, wherein the internal electrode layer has a thickness not larger than 0.3 μm.

6. The multilayer ceramic capacitor according to claim 5, wherein the dielectric ceramic layer has a thickness not larger than 0.6 μm.

7. The multilayer ceramic capacitor according to claim 2, wherein the dielectric ceramic layer has a thickness not larger than 0.6 μm.

8. The multilayer ceramic capacitor according to claim 2, wherein the plurality of dielectric ceramic layers further contain a rare earth element.

9. The multilayer ceramic capacitor according to claim 8, wherein the rare earth element is selected from Ho, Dy, and Y.

10. The multilayer ceramic capacitor according to claim 1, wherein
the first and second external electrodes include:
a first Ni layer on the first end surface and the second end surface of the multilayer body, respectively,
a second Ni layer on the first Ni layer, and
an Sn layer on the second Ni layer.

11. The multilayer ceramic capacitor according to claim 1, wherein the internal electrode layer has a thickness not larger than 0.4 μm.

12. The multilayer ceramic capacitor according to claim 11, wherein the dielectric ceramic layer has a thickness not larger than 0.6 μm.

13. The multilayer ceramic capacitor according to claim 1, wherein the internal electrode layer has a thickness not larger than 0.3 μm.

14. The multilayer ceramic capacitor according to claim 13, wherein the dielectric ceramic layer has a thickness not larger than 0.6 μm.

15. The multilayer ceramic capacitor according to claim 1, wherein the dielectric ceramic layer has a thickness not larger than 0.6 μm.

16. The multilayer ceramic capacitor according to claim 1, wherein the external electrode contains a dielectric composition of the plurality of dielectric ceramic layers at a ratio not lower than 25 area % and not higher than 40 area %.

17. The multilayer ceramic capacitor according to claim 1, wherein the plurality of dielectric ceramic layers further contain a rare earth element.

18. The multilayer ceramic capacitor according to claim 17, wherein the rare earth element is selected from Ho, Dy, and Y.

* * * * *